United States Patent [19]
Hills

[11] Patent Number: 4,757,616
[45] Date of Patent: Jul. 19, 1988

[54] RULER WITH MAGNIFYING CURSOR

[75] Inventor: Brian Hills, Rolling Hills Estates, Calif.

[73] Assignee: Educational Insights, Dominguez Hills, Calif.

[21] Appl. No.: 112,403

[22] Filed: Oct. 26, 1987

[51] Int. Cl.⁴ .................... B43L 7/00; G02B 27/02
[52] U.S. Cl. .................................... 33/488; 350/116
[58] Field of Search .................. 33/488; 350/114, 115, 350/116

[56] References Cited

U.S. PATENT DOCUMENTS

| | | | |
|---|---|---|---|
| 1,667,449 | 4/1928 | Wompner | 350/116 |
| 2,736,097 | 2/1956 | Coleman | 33/488 |
| 3,163,540 | 1/1965 | Geiser | 33/488 |

*Primary Examiner*—Harry N. Haroian
*Attorney, Agent, or Firm*—Roger A. Marrs

[57] ABSTRACT

A ruler for use in the measurement of distances on a flat surface is disclosed herein, having an elongated base with raised edge marginal regions defining a T-shaped recess therebetween. A first edge marginal region displays a plurality of analog measurement increments in the form of transverse marked lines while numerical indicia associated with each line increment is carried at the bottom of the recess. A cursor having an inverted T-shaped portion is slidably engaged with the base T-shaped recess. The cursor further includes a guide rail on one side frictionally engaged with a track provided on a second one of the edge marginal regions while cantilevered finger having an index line thereon projects over the first edge marginal region for selected registration with the end of an object being measured. An enlarged semicircular magnifier is carried on the cursor midway between its opposite sides for visually enlarging numerical indicia associated with a measurement line mark selected by registration of the index line therewith.

5 Claims, 1 Drawing Sheet

RULER WITH MAGNIFYING CURSOR

BACKGROUND OF THE INVENTION

1. Field of the Invention

The present invention relates to the field of measuring devices and more particularly to a novel ruler for measuring the length of an object wherein the ruler includes a sliding cursor having magnifying means carried thereon for visually enlarging numerical indicia for the convenience of the user.

2. Brief Description of the Prior Art

In the past, it has been the conventional practice to employ an elongated ruler having spaced increments carried along one edge, which are related to numerical indicia carried along the midsection of the ruler but related or associated with each one of the respective measurement increments. Since it is desirable to display as many increments as possible within a given measurement distance, the size of the increments is very small and the associated numerical indicia with each of the increments is small and difficult to accurately discern. Many mistakes have been made in associating numerical indicia incorrectly with measurement markings that are not properly related due to the small size of the increments and the indicia.

Some attempts have been made to enlarge the numerical indicia by providing a magnifying glass which is used in one hand while the user holds the ruler in the other hand. Obviously, this is inconvenient and restricts the user so that pencils, writing implements or other implements cannot be used during the measurement procedure. In other instances, the magnifying glass has been elaborately placed on a separate device which is manually positioned over the ruler while a measurement is being taken. Inasmuch as the magnifying device is not carried on the ruler, loss or misplacement of the device oftentimes occurs and registration of the device with the ruler and its increments, as well as numerical indicia, is manually required by the user. In other words, since the magnifying device and the ruler are two separate items, there is no alignment or guidance means corelating the two devices for the convenience of the user.

Therefore, a long standing need has existed to provide a novel combined ruler and magnifying means that includes alignment and guidance means so that the magnifying means can be properly disposed so as to corelate measurement increment markings and numerical indicia. Display of the magnified numerical indicia should be augmented so that associated or other indicia on opposite sides of the selected numerical indicia are obscured or not magnified whereby the selected numerical indicia is magnified solely.

SUMMARY OF THE INVENTION

Accordingly, the above problems and difficulties are obviated by the present invention which provides a novel ruler or measuring device for use in the measurement of distances or length of an object placed on a flat surface. The novel measuring device includes an elongated base with raised edge marginal regions arranged in parallel spaced-apart relationship so as to define a T-shaped recess adapted to slidably carry a movable cursor along the length of the ruler. A first edge marginal region of the pair displays a plurality of measurement increments in the form of transverse marked lines while numerical indicia associated with each line increment is carried at the bottom of the recess between the edge marginal regions. The cursor includes an inverted T-shaped portion engaged with the recess on the base so that the cursor slidably moves in a longitudinal direction along the length of the ruler. Guide means are provided on one side of the cursor in slidable frictional engagement with a track along one edge marginal region of the ruler whereby the cursor is captured thereon in combination with the T-shaped slot and cursor portion. Magnifying means are carried on the cursor for enlarging selected indicia when an index marker carried on a cantilevered finger from the side of the cursor is aligned with the end of an object intended to be measured. A further feature resides in the provision of opaque portions separated by a window through which the enlarged and magnified numerical indicia is displayed. The opaque portions obscure adjacent numerical indicia so that only the selected indicia is displayed.

Therefore, it is among the primary objects of the present invention to provide a novel ruler with magnifying means in a unitary combination wherein selected numerical indicia is magnified to the exclusion of adjacent numerical indicia when an index marker is placed in or near registry with a selected measurement increment.

Another object of the present invention is to provide a novel measuring device having an elongated base carrying numerical indicia associated with measurement increments and on which a magnifying means is slidably carried and operable to visually enlarge selected numerical indicia as a measurement of an object whose length is being determined.

Yet another object of the present invention is to provide a novel magnifying means for numerical indicia on a ruler which moves longitudinally along the length of the ruler and is captured thereon, and which further includes frictional and guide means for aiding the user in moving the cursor or magnifying means in short, deliberate movements.

Still a further object of the present invention resides in the provision of a means for increasing a person's ability to read numerical data on a measuring device wherein the user will see the exact measurement without the necessity of counting little line increments between numerical inch markers. In this manner, the user may be readily instructed in fractions and other mathematical uses.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
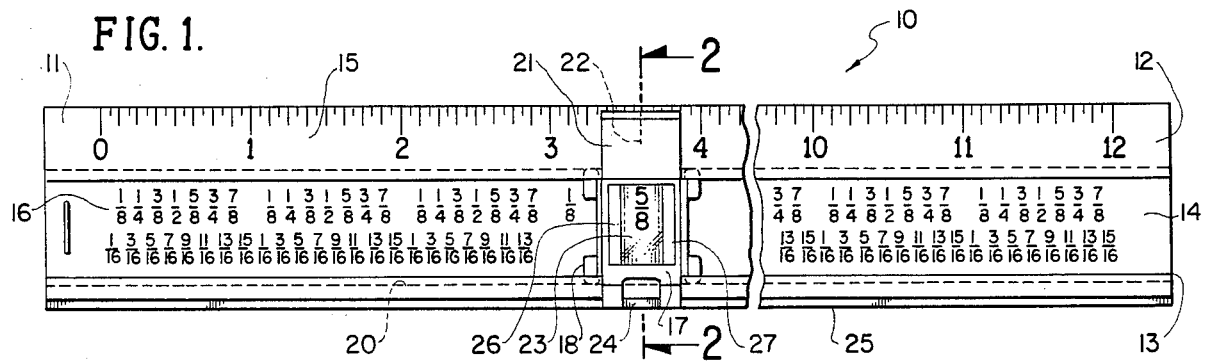
FIG. 1 is a top plan view of the novel ruler incorporating a magnifying cursor in accordance with the present invention.

Referring to FIG. 1, the novel measuring device of the present invention is illustrated in the general direction of arrow 10 which includes a ruler having an elongated base represented in general by numeral 11, and which is formed with a pair of parallel edge marginal regions represented by numerals 12 and 13 respectively which are separated by a recess or groove 14. The edge marginal region 12 is employed for carrying a measurement scale which, for illustrative purposes, is measured in inches from zero to 12. The inches are indicated by the proper numeric value whereas fractions of an inch are indicated by a line indicator or mark without numeric identification.

However, the numeric identification is displayed on the base 11 at the bottom of the recess 14, and the fractional numeric values are arranged in a staggered relationship due to the fact that the line markers between the inch markers are close together and the numeric fractional values cannot be physically arranged near enough to the line markers along the edge on the edge marginal region 12. The fractional values can be displayed on the base 11 at the botton of the recess and the values can be properly aligned with the line markers on the scale so as to be substantially in a transverse association with each and every one of the fractional line indicators in the scale. Th scale is broadly indicated by numeral 15, while the numeric values for the fractional indicators are broadly indicated by numeral 16. It can be seen in the latter relationship that one grouping of fractions, such as those fractions pertaining to eighths of an inch, fourths of an inch and half of an inch are arranged in one row while fractional numeric values represented by sixteenths of an inch are arranged in a second row, positioned between the numerical values of the first mentioned row.

Although it is possible for the user of the measurement device to visually align the fractional numeric values with proper line indicators on the scale 15, it is more convenient and easier to use a magnifying device which takes the form of a cursor 17, movably carried between the opposing surfaces of the raised edge marginal regions between the opposite ends of the base 11. The cursor includes a unitary body composed of transparent material that includes at least four mounting legs, such as leg 18, which fit into grooves, such as groove 20, for slidably carrying the cursor. The recess 14 is an inverted T-shape so that the feet 18 of the cursor fit within an elongated slot undercut on each of the respective edge marginal regions 12 and 13. In this manner, the cursor is slidably coupled to the base by a tongue-in-groove arrangement that stabilizes the cursor so that it will not wiggle or wobble as the magnifying means is being used.

It is also to be noted that one side of the cursor includes an elongated finger 21 that cantilevers over the measurement scale 15 on the edge marginal region 12 and the finger 21 includes an index marker 22 intended to be aligned by the user with the end of the object to be measured so as to reside adjacent to or on a line marker of the scale 15. When this location has been selected, a magnifying means taking the form of a dome 23 resides over the associated numeric value or indicia and this value is magnified, which in the present illustration, represents the fractional value $\frac{5}{8}$. As can be noticed in the drawing, the fractional value is substantially enlarged from the size of the fractional value shown in either of the rows of displayed fractional values 16.

FIG. 1 further illustrates that the cursor 17 is supported and stabilized on the ruler 11 by means of an outwardly projecting rail 24 which rides in or on a track 25 provided in the edge marginal region 13 of the body. The guide means comprising the rail 24 and the track 25 prevent the curso from wobbling in combination with the plurality of feet 18 that reside within the slots of the recess. Also, the arrangement of the rail 24 with respect to the associated feet 18 on the cursor combine to provide a certain amount of friction which is yieldable by the user to slide the cursor to a desired location on the body 11.

Also, FIG. 1 illustrates that the cursor 17 includes parallel marginal areas 26 and 27 which block or hide the fractional numeric values underneath so that the numeric value appearing through the window 23 is visible. The opaque areas 26 and 27 form a frame about the window magnifier 23 that aids the user in reading the enlarged fractional value appearing under the cursor.

Figure 2:
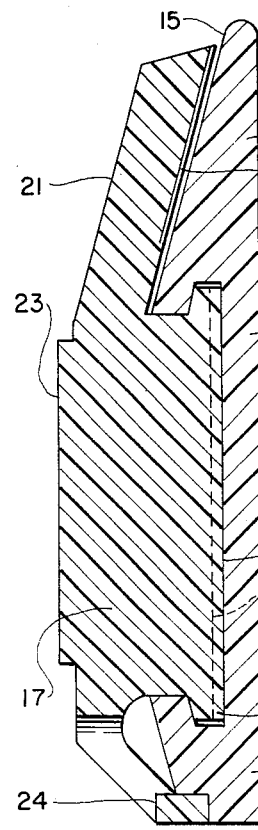
FIG. 2 is an enlarged transverse cross-sectional view of the ruler shown in FIG. 1 as taken in the direction of arrows 2—2 thereof.
Figure 3:
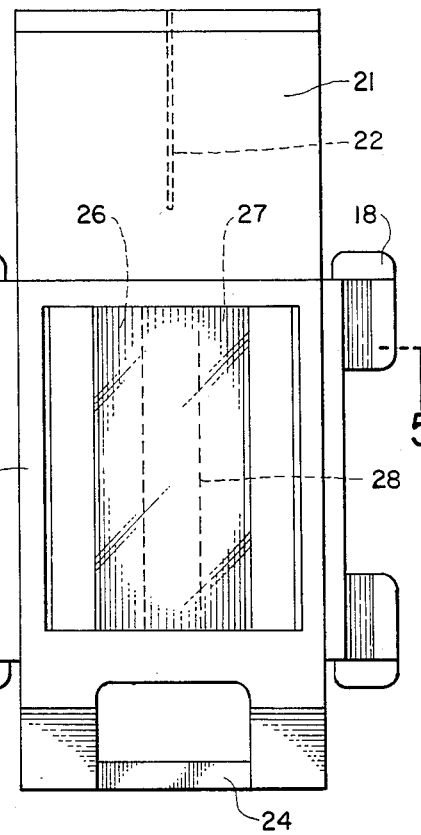
FIG. 3 is a top plan view of the magnifying cursor shown in FIG. 1.
Figure 4:
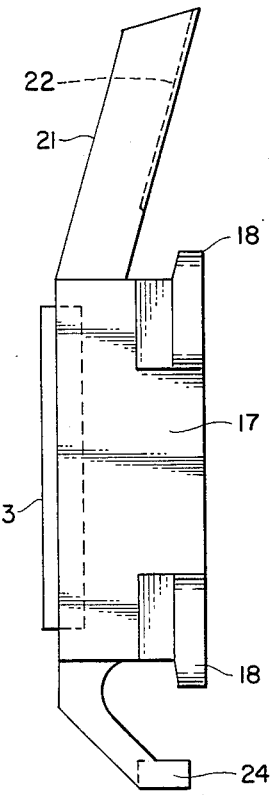
FIG. 4 is a side elevational view of the cursor shown in FIG. 3.
Figure 5:
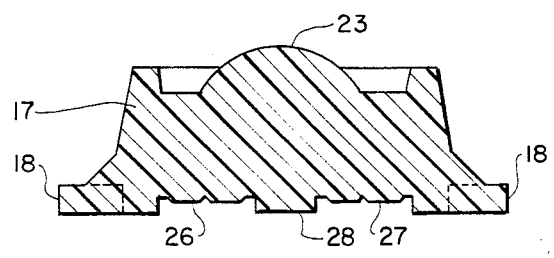
FIG. 5 is a transverse cross-sectional view of the cursor as taken in the directions of arrows 5—5 of FIG. 3.

Referring now in detail to FIGS. 2, 3 and 4, it can be seen that the cursor 17 is composed of a transparent material with the undersurface of the cursor being ribbed or scored so as to be substantially opaque to define the areas 26 and 27. FIG. 5 substantially shows these areas as being heavily scored so as to distort or prevent the appearance of fractional numeric values from appearing through the window magnifier 23. FIG. 2 substantially shows that the underside of the cursor 17 is of a substantially inverted T-shaped portion with outward projections, such as feet 18, that reside within the slots opposing each other formed in the edge marginal regions 12 and 13 and as separated by the display area of the base at the bottom of recess 14. The rail 24 resides within the track 25 and the distance between the rail and the feet is substantially fixed so as to provide the amount of friction necessary to yieldably hold the cursor in position on the body 11.

The magnifier window 23 is of a semicircular configuration and is of sufficient length to cover the two rows of fractional numeric values 16 underlying the cursor. The index marker 22 is preferably a scored line into which a colored material, such as red, has been placed. Directly beneath the window 23 is an optically flat surface 28, as seen in FIG. 5, which lies directly over the fractional numeric value intended to be enlarged. The framing or opaque borders 26 and 27 are recessed below the surface 28 and are separated by the surface. The surface is midway between the opposite sides of the cursor and extends along in parallel spaced relationship with the dome magnifying window 23.

Therefore, it can be seen from the foregoing that the magnifying means of the present invention provides a novel measurement device which, in combination, provides an elongated measurement scale having associated fractional numeric values displayed in close proximity and in alignment with respective fractional line markers on the scale. The sliding cursor may be readily moved by the user until the index marker 22 is at the end of an object intended to be measured. The user can now visually observe the enlarged fractional value through the magnifying window 23 without the aid of any other optical device. The marker 22 is maintained in position by means of the frictional contact of the guide rail 24 with its associated track 25 and in combination with the feet 18 on the body of the cursor. It is also to be noted that the major body portion of the cursor resides in sliding contact between the opposing surfaces of the edge marginal regions 12 and 13 so that the recess 14 is substantially occupied by the cursor in transverse cross-section, as shown in FIG. 2.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A measuring device for determining the length of an object or distance comprising the combination of:
    an elongated base having a central recess separated by a pair of edge marginal regions having opposing wall surfaces defining said central recess;
    said base recess characterized as a T-shaped recess having a pair of opposing slots in said wall surfaces of said respective edge marginal regions;
    a first one of said edge marginal regions having a plurality of line increment marks as a measurement scale carried along a straight edge against which the object or distance is measured;
    two rows of staggered numerical indicia of different fractional values carried on said base at the bottom of said recess and each numerical fractional value assocated with and aligned with a particular line increment mark of said measurement scale;
    a cursor composed of transparent material movably carried on said base and having an index marker carried on a cantilevered finger over said measurement scale adapted to be registered with a selected one of said line increment marks at the end of the object or distance to be measured;
    said cursor further having a magnifying means centrally disposed thereon in linear alignment with said index marker and immediately about said recessed display of numerical indicia whereby alignment of said index marker with selected line increment marks reveals an enlarged display of a selected numerical indicia of a given fractional value; and
    framing means carried on said cursor on either side of said magnifying means for obscuring non-selected numerical indicia.

2. The invention as defined in claim 1 including:
    guide means interconnecting said cursor with said base to stabilize and guide said cursor along the length of said base.

3. The invention as defined in claim 2 wherein:
    said guide means includes an open and exposed track disposed on the second edge marginal region of said pair and a rail fixedly carried on said cursor disposed in said track.

4. The invention as defined in claim 3 including:
    means for slidably mounting said cursor on said base comprising a tongue-in-groove arrangement wherein said base recess is characterized as an inverted T-shaped recess having a pair of opposing slots provided in said wall surfaces of said respective edge marginal regions;
    said mounting means further including foot portions outwardly projecting from said cursor insertable into said pair of slots in sliding relationship.

5. The invention as defined in claim 4 wherein:
    said magnifying means includes a rounded surface on the top thereof and an optically flat surface on the underside in center alignment with said rounded surface.

* * * * *